(12) United States Patent
Chassard et al.

(10) Patent No.: US 10,097,124 B2
(45) Date of Patent: Oct. 9, 2018

(54) VOLTAGE REGULATOR OF A MOTOR VEHICLE ALTERNATOR, REGULATOR BRUSH-HOLDER, AND CORRESPONDING ALTERNATORS

(71) Applicant: VALEO EQUIPEMENTS ELECTRIQUES MOTEUR, Creteil (FR)

(72) Inventors: Pierre Chassard, Creteil (FR); Pierre Tisserand, Limeil Brevannes (FR)

(73) Assignee: Valeo Equipments Electriques Moteur, Creteil (FR)

( * ) Notice: Subject to any disclaimer, the term of this patent is extended or adjusted under 35 U.S.C. 154(b) by 0 days.

(21) Appl. No.: 15/565,490

(22) PCT Filed: Apr. 19, 2016

(86) PCT No.: PCT/FR2016/050904
§ 371 (c)(1),
(2) Date: Oct. 10, 2017

(87) PCT Pub. No.: WO2016/170262
PCT Pub. Date: Oct. 27, 2016

(65) Prior Publication Data
US 2018/0083560 A1 Mar. 22, 2018

(30) Foreign Application Priority Data
Apr. 20, 2015 (FR) ...................... 15 53509

(51) Int. Cl.
*H02P 9/10* (2006.01)
*H02P 9/30* (2006.01)
(Continued)

(52) U.S. Cl.
CPC ............... *H02P 9/305* (2013.01); *G05F 1/00* (2013.01); *H02P 9/10* (2013.01); *H02P 2101/45* (2015.01)

(58) Field of Classification Search
USPC .............................................. 322/25, 28, 86
See application file for complete search history.

(56) References Cited

U.S. PATENT DOCUMENTS 4,019,120 A * 4/1977 Fattic ................... H02J 7/1461
322/28
4,115,729 A * 9/1978 Young .................. H02M 1/081
307/10.6

(Continued)

FOREIGN PATENT DOCUMENTS

DE 102012217330 A1 3/2013
FR 2938135 A1 5/2010
GB 2246254 A 1/1992

*Primary Examiner* — Pedro J Cuevas
(74) *Attorney, Agent, or Firm* — Berenato & White, LLC (57) ABSTRACT

The invention relates to a voltage regulator (43) for a motor vehicle alternator (44). The device comprises a control module (I) for controlling an excitation current (Iexc) in an excitation winding (3) of the alternator (44) according to a difference (5) between a setpoint voltage (DO) and a control voltage (Dbat) of an on-board network (9). The on-board network (9) of the vehicle is powered by a battery (10) to which the alternator (44) is connected. According to the invention, the voltage regulator (43) further comprises a safety module (30) that monitors the control voltage (Ubat) and which is separate from the control module (I). In a particular embodiment, the control module (I) and the safety module (30) are connected electrically by external bonding interconnections.

19 Claims, 7 Drawing Sheets

(51) Int. Cl.
*G05F 1/00* (2006.01)
*H02P 101/45* (2016.01)

(56) References Cited

U.S. PATENT DOCUMENTS

| | | | | | |
|---|---|---|---|---|---|
| 4,264,856 | A | * | 4/1981 | Frierdich | H02P 9/107 322/25 |
| 4,310,793 | A | * | 1/1982 | Sheldrake | H02J 7/16 320/152 |
| 4,401,937 | A | * | 8/1983 | Morishita | H02J 7/166 320/123 |
| 4,629,968 | A | * | 12/1986 | Butts | H02P 9/107 322/28 |
| 4,636,705 | A | * | 1/1987 | Bowman | H02J 7/245 307/110 |
| 5,079,496 | A | * | 1/1992 | Pierret | H02J 7/242 322/28 |
| 5,221,886 | A | * | 6/1993 | Pierret | H02J 7/244 322/28 |
| 5,285,146 | A | * | 2/1994 | Pierret | H02J 7/245 322/25 |
| 6,064,186 | A | * | 5/2000 | Pierret | H02J 7/163 322/28 |
| 8,829,862 | B2 | | 9/2014 | Chassard et al. | |
| 2008/0129255 | A1 | | 6/2008 | Holguin | |
| 2013/0154546 | A1 | | 6/2013 | Kleczewski et al. | |

* cited by examiner

VOLTAGE REGULATOR OF A MOTOR VEHICLE ALTERNATOR, REGULATOR BRUSH-HOLDER, AND CORRESPONDING ALTERNATORS

CROSS-REFERENCE TO RELATED APPLICATIONS AND CLAIM TO PRIORITY

This application is a national stage application of International Application No. PCT/FR2016/050904 filed Apr. 19, 2016, which claims priority to French Patent Application No. 1553509 filed Apr. 20, 2015, the disclosures of which are incorporated herein by reference and to which priority is claimed.

FIELD OF THE INVENTION

The present invention relates to a voltage regulator of a motor vehicle alternator, as well as to the regulator brush-holder and the alternator comprising this regulator brush-holder.

BACKGROUND OF THE INVENTION

In the motor vehicle field, it is well known to maintain the voltage which is supplied to the on-board electrical network by the alternator of the vehicle at a predetermined set value, independently from the speed of rotation of the engine or the electrical consumption of the equipment, by means of a regulation device known as a "regulator".

Nowadays, motor vehicle parts manufacturers have developed very high-performance alternators by implementing electronic power systems controlled by circuits which use digital techniques, based in particular on the use of microprocessors or microcontrollers.

Unlike the former bimetal regulators, which operated around a fixed regulation voltage, independently from the operating mode of the vehicle, modern electronic regulation devices take advantage of the processing capacities of the electronics in order to receive variable set values transmitted by a control unit of the engine, for the purpose of optimising the collection of torque, according to the production of electrical energy necessary.

The engine control unit can communicate with the regulator of the alternator, and command a particular operating mode of the latter.

The information which is transmitted in return to the engine control unit is very often information relating to an excitation current of the alternator.

In the most modern regulators, such as the one developed by the company VALEO EQUIPEMENTS ELECTRIQUES MOTEUR described in patent application FR2938135, the regulation circuit is in the form of an ASIC (acronym for "Application Specific Integrated Circuit") which is connected by external interconnections (known as bonding) to a circuit of tracks of a brush-holder, such as to form an assembly in a single piece known as the "regulator brush-holder", which can be integrated on a rear bearing of the alternator.

This regulator is programmable, and can therefore be adapted to a plurality of applications, and comply with various specifications of the motor vehicle manufacturers, without significant modifications.

However, its single-chip architecture does not protect it against failure, and, in this case, since the regulation function is no longer ensured, excess voltage is generated on the on-board network of the vehicle by the alternator.

SUMMARY OF THE INVENTION

The objective of the present invention is consequently to eliminate this disadvantage.

Specifically, its subject is a voltage regulator of a motor vehicle alternator of the type comprising a regulation module which can control an excitation current in an excitation winding of the alternator, according to a difference between a set voltage and a regulation voltage of an on-board network of the vehicle supplied by a battery to which this alternator is connected.

A regulation module of this type comprises:
a first earthing terminal which is designed to be connected to an earth of the on-board network;
a first supply terminal which is designed to be connected to a positive line of the on-board network;
a first excitation terminal which is designed to be connected to the excitation winding;
a measurement terminal which is designed to measure the regulation voltage; and it comprises:
a voltage divider bridge, which is connected firstly to the measurement terminal and secondly to the first earthing terminal;
a subtracter which is connected at its input to the set voltage, and to a midpoint of the voltage divider bridge;
a regulation loop which is connected at its input to the subtracter, and controls at its output a first semiconductor switch which is connected between the first supply terminal and the first excitation terminal;
a first free wheel diode which is connected between the first excitation terminal and the first earthing terminal.

According to the invention, this regulator also comprises a safety module which carries out a function of monitoring of the regulation voltage, which module is distinct from the regulation module.

According to a first embodiment of the invention, the measurement terminal is combined with the first supply terminal, and the safety module comprises:
a second supply terminal which is designed to be connected to the positive line of the on-board network;
a second earthing terminal which is designed to be connected to the earth;
a second excitation terminal which is connected to the first excitation terminal;
a third excitation terminal which is designed to be connected to the excitation winding; and it comprises:
a second semiconductor switch which is connected in series to this excitation winding, between the second and third excitation terminals;
a second free wheel diode which is connected between the third excitation terminal and the second earthing terminal;
a control circuit which commands a blocked state of the second semiconductor switch in the event of detection of an excess voltage on the second supply terminal relative to the said second earthing terminal, and commands re-establishment of an "on" state in the absence of the excess voltage, according to a predetermined strategy.

According to this first embodiment of the invention, the safety module comprises standby and wake-up modes which are dependent on a variation of an excitation voltage on the second excitation terminal.

According to a second embodiment of the invention, the measurement terminal is also combined with the first supply terminal, and the safety module comprises:
- a second supply terminal which is designed to be connected to the positive line of the on-board network;
- a second earthing terminal which is connected to the first supply terminal;
- a third earthing terminal which is designed to be connected to the said earth; and it comprises:
- a second semiconductor switch which is connected in series to the regulation module between the second supply terminal and the second earthing terminal;
- a control circuit which commands a blocked state of the second semiconductor switch in the event of detection of an excess voltage on the second supply terminal relative to the third earthing terminal, and commands re-establishment of an "on" state in the absence of the excess voltage, according to a predetermined strategy.

According to a variant of the second embodiment of the invention, the measurement terminal is designed to be connected to the positive line of the on-board network, and the safety module comprises:
- a second supply terminal which is designed to be connected to the positive line of the on-board network;
- a second earthing terminal which is connected to the first supply terminal;
- a third earthing terminal which is designed to be connected to the earth; and it comprises:
- a second semiconductor switch which is connected in series to the regulation module between the second supply terminal and the second earthing terminal;
- a control circuit which commands a blocked state of this second semiconductor switch in the event of detection of an excess voltage on the second supply terminal relative to the third earthing terminal, and commands re-establishment of an "on" state in the absence of the excess voltage, according to a predetermined strategy.

In this variant, according to the invention, the regulation module additionally comprises a first monitoring device which controls the first semiconductor switch in a first open state when a first differential voltage between the first supply terminal and the measurement terminal is greater than a first predetermined threshold.

According to the invention, the regulation module additionally comprises a second monitoring device which controls the first semiconductor switch in a second open state when a second differential voltage between the measurement terminal and the first supply terminal is greater than a second predetermined threshold.

The first and second monitoring devices of this variant send respectively a first or second alarm to a dashboard of the vehicle in the event, respectively, of breaking of a connection between the measurement terminal and the positive line of the on-board network, or a failure of the second semiconductor switch.

The invention also relates to a regulator brush-holder of a motor vehicle alternator comprising a regulator with the above characteristics.

According to the invention, in this regulator brush-holder, the regulation module and the safety module are connected electrically by external interconnections of the bonding type.

The regulation module and the safety module are also connected electrically by other external interconnections of the bonding type to a circuit of tracks which is connected, firstly to brushes which can ensure an electrical connection to the excitation winding, and secondly, to a first screw which forms a positive terminal of the alternator, and to a second screw which forms a negative terminal of this alternator.

The invention also relates to a motor vehicle alternator comprising a regulator brush-holder of this type.

These few essential specifications will have made apparent to persons skilled in the art the advantages provided by the voltage regulator according to the invention, as well as by the corresponding regulator brush-holder and the alternator, relative to the prior art.

The detailed specifications of the invention are given in the description which follows in association with the appended drawings. It should be noted that these drawings serve the purpose simply of illustrating the text of the description, and do not constitute in any way a limitation of the scope of the invention.

DETAILED DESCRIPTION OF THE PREFERRED EMBODIMENT(S)

Figure 1:
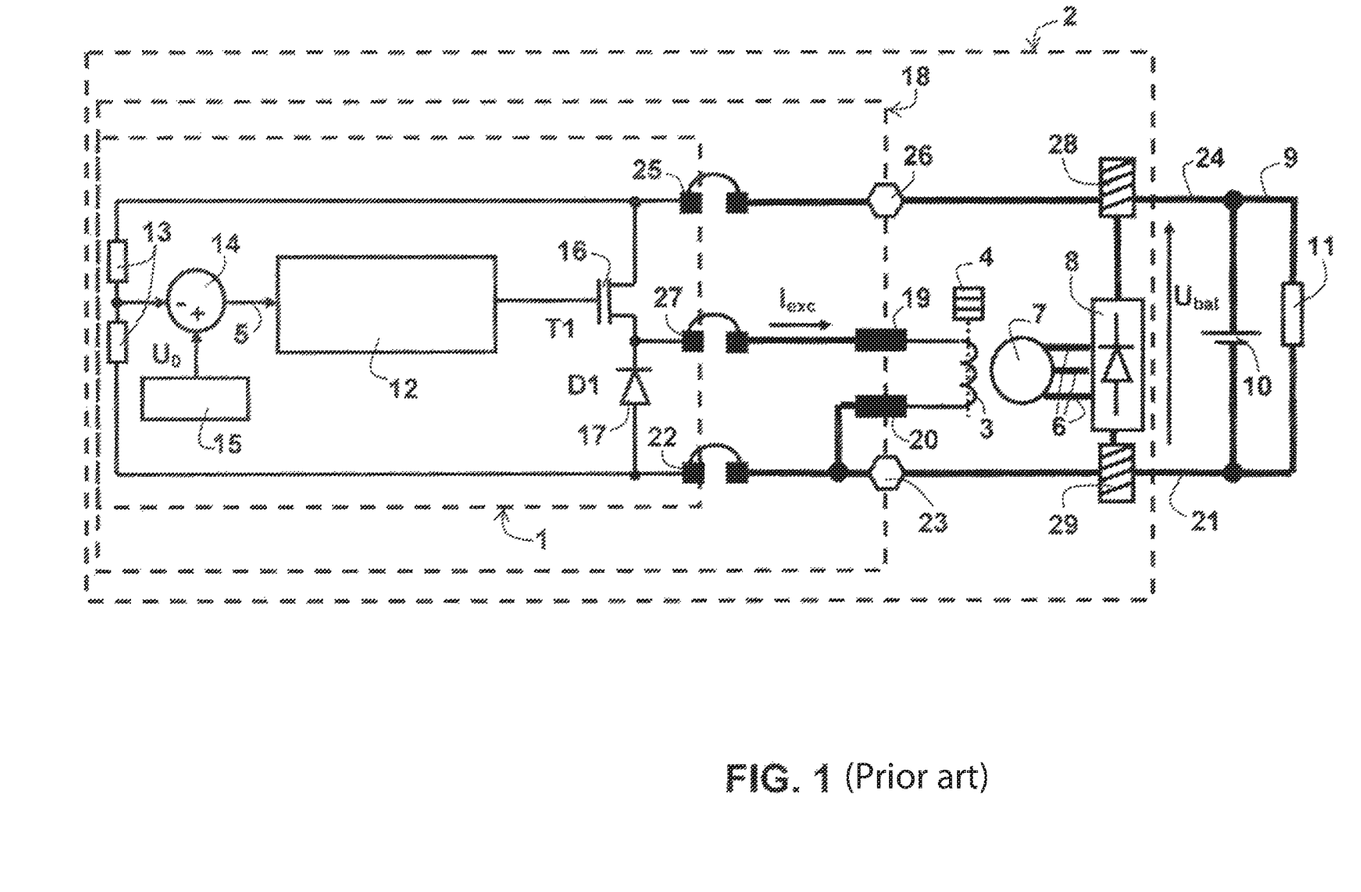
FIG. 1 is an overview of a voltage regulator for an alternator known in the prior art.

A diagram of a voltage regulator 1 of the type to which the invention relates is represented in FIG. 1.

This is a voltage regulator 1 for an alternator 2 with excitation for an application in a motor vehicle.

This voltage regulator 1 is of the single-chip type, i.e. a regulation module 1 produced in the form of an ASIC contains all the electronic components necessary to control the excitation current Iexc which circulates in the excitation winding 3 of a rotor 4 of the alternator 2 according to a difference 5 between a set voltage U0 and the regulation voltage Ubat supplied by phases 6 of the stator windings 7 of the alternator 2, after rectification 8 on the on-board network 9, to which the battery 10 of the vehicle and various charges 11 are connected.

These electronic components are:
- a regulation loop 12;
- a voltage divider bridge 13 for adaptation of the regulation voltage Ubat to the voltage level required by the regulation loop 12;
- a subtracter 14 which generates the difference between the set voltage U0 stored 15 and the regulation voltage Ubat;
- a first semiconductor switch 16 of the MOSFET type which controls the excitation current Iexc commanded by a pulse width modulated signal (MLI), with a duty cycle which is variable according to a result 5 of the subtracter 14, generated by the regulation loop 12;

a first free wheel diode 17, in which the demagnetising current of the rotor 4 circulates when the first semiconductor switch 16 is open.

Mostly, this type of single-chip regulator is integrated in a brush-holder 18 which comprises receptacles to receive brushes 19, 20, thus ensuring an electrical connection with the excitation winding 3 of the rotor 4 by means of a rotary collector.

The brush-holder 18 comprises a circuit of tracks (in thick lines in FIG. 1) which makes it possible to connect the regulation module 1:

to an earth 21 of the on-board network 9, by means of a first earthing terminal 22 by means of a negative regulation plug 23;

to a positive line 24 of the on-board network 9, by means of a first supply terminal 25 by means of a positive regulation plug 26;

to one of the brushes 19 by means of a first excitation terminal 27, with the other brush 20 being connected to the negative regulation plug 23.

The positive regulation plug 26 and the negative regulation plug 23 of the brush-holder 18 are connected respectively by means of wired connections to a first screw 28 which generally forms a positive terminal B+A of the alternator 2, and to a second screw 29 which forms a negative terminal of the alternator 2, generally the earth.

The first supply terminal 25 is also the measurement terminal from which the regulation voltage Ubat is collected by means of the voltage divider bridge 13. As a result of the wired connections between the brush-holder 18 and the alternator 2, a voltage at the terminals of the regulator 1 and the regulation voltage Ubat are identical.

Figure 2:
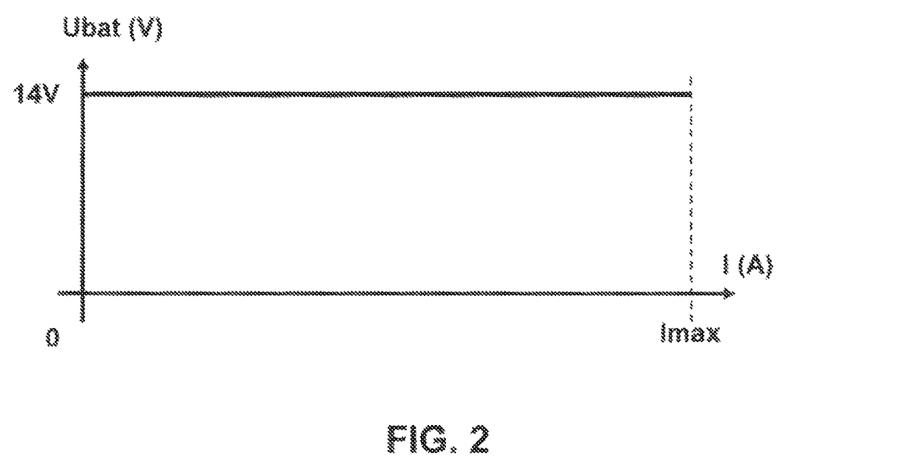
FIG. 2 illustrates the development of the regulation voltage according to the output for the regulator shown in FIG. 1.

Thus, the regulation voltage Ubat according to the charge of the alternator 2 measured between the screw B+A 28 and the earthing screw 29 of the alternator 2 is very close to the set voltage U0 (for example 14V), depending on the output I of the alternator 2, as shown clearly in FIG. 2.

However, this voltage regulator 1, shown in FIG. 1, has a disadvantage, since in the event of failure of the regulation module 1 (for example when the first semiconductor switch 16 remains blocked in the "on" state), the rotor 4 is supplied permanently via the first supply terminal 25 and the first excitation terminal 27.

The regulation function is no longer ensured in this case, and an excess voltage is generated on the on-board network 9.

In order to prevent this excess voltage on the on-board network 9 in the event of failure of an electronic component 16 of the voltage regulator 1, it is then necessary to implement a security mechanism using a second module which is separate from the regulation module 1, and carries out a function of monitoring of the regulation voltage Ubat of the on-board network 9 of the vehicle by the alternator 2.

Figure 3A:
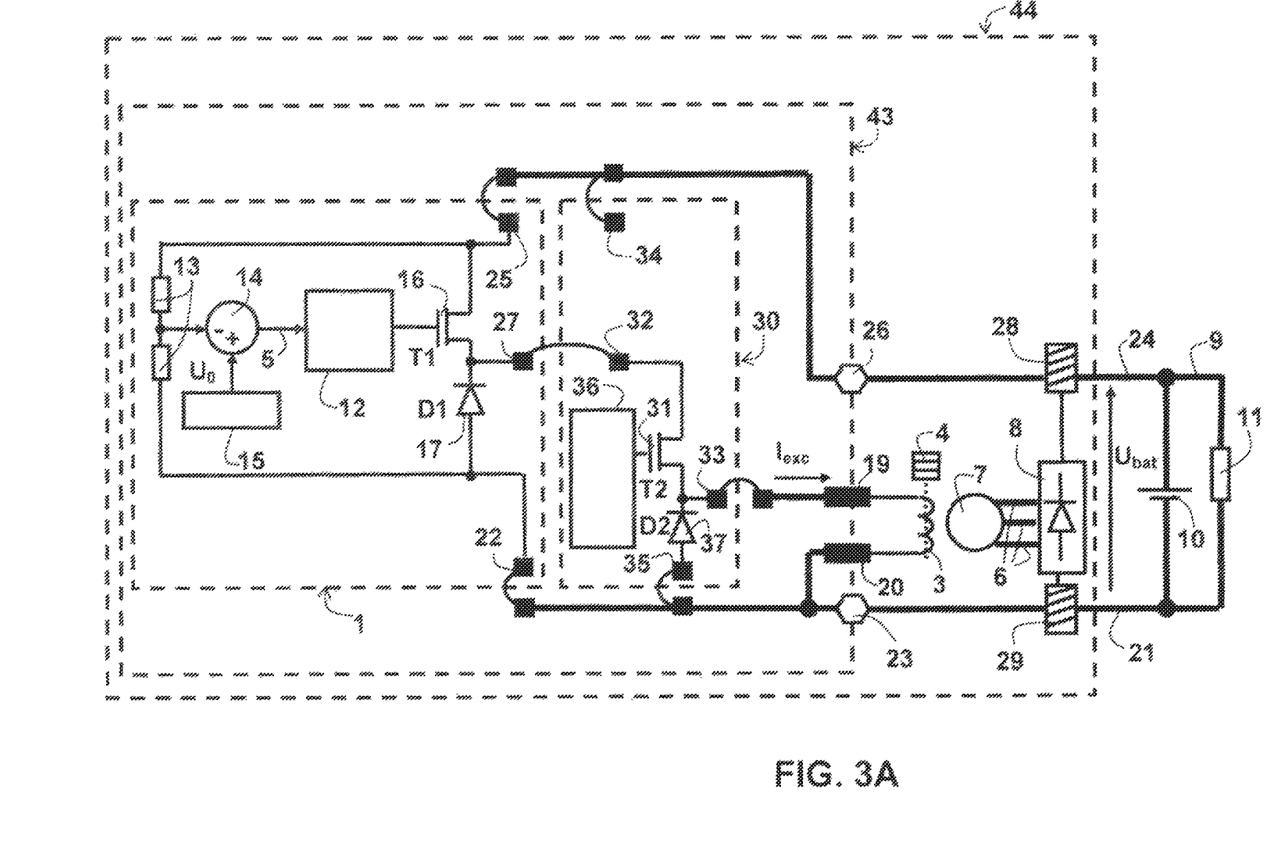
FIG. 3A is an overview of a voltage regulator for an alternator equipped with a safety module according to a first embodiment of the invention.

FIG. 3A shows schematically an alternator 2, 44 comprising a regulator brush-holder 18, 43 incorporating a voltage regulator 1 and a safety module 30 corresponding to a first embodiment of the invention, which eliminates the aforementioned disadvantage.

In this first embodiment, a safety module 30 is interposed between the excitation winding 3 and a regulation module 1 which is identical to that of the known voltage regulator shown in FIG. 1.

This safety module 30 comprises a second semiconductor switch 31 of the MOSFET transistor type which is connected in series to the excitation winding 3 at the output of the regulation module 1.

This safety module 30 comprises a second excitation terminal 32 which is connected to the first excitation terminal 27 of the regulation module 1, and a third excitation terminal 33 which is designed to be connected to the brush 19 of the excitation winding 3.

It is supplied between the second supply terminal 34 which is designed to be connected to the positive line 24 of the on-board network 9, and a second earthing terminal 35 which is designed to be connected to the earth 21.

The second semiconductor switch 31 is connected between these second and third excitation terminals 32, 33, such as to cut off the excitation current Iexc when a control circuit 36 detects an excess voltage on the second supply terminal 34 relative to the second earthing terminal 35.

A second free wheel diode 37 is connected between the third excitation terminal 33 and the second earthing terminal 35, such as to make the demagnetising current of the rotor 4 circulate when the second semiconductor switch 31 is blocked.

In the case of operation without failure of the voltage regulator 1, 30, the second semiconductor switch 31 remains in the "on" state; the current which magnetises the rotor 4, obtained from the battery 10, circulates via the first semiconductor switch 16, then the second 31.

When the first semiconductor switch 16 is blocked during the low states of the pulse width modulated signal of the regulation loop 12, the first and second free wheel diodes 17, 37 allow the demagnetisation current to circulate.

In the case of failure of the voltage regulator 1, 30, the first semiconductor switch 16 can remain switched in the "on" state (example of a possible failure mode).

The safety module 30 then detects an excess voltage on the on-board network 9, and cuts off the excitation current Iexc whilst blocking the second semiconductor switch 31.

The demagnetisation is then carried out by the second free wheel diode 37.

A strategy of cut-off of the excitation current Iexc and re-engagement of this excitation current Iexc is implemented by the safety module 30 according to a predetermined control.

A standby mode of the safety module 30 can be based on reading an activity of the pulse width modulated signal.

If activity of the pulse width modulated signal exists (detection of variation of an excitation voltage on the second excitation terminal 32), then the safety module 30 is positioned in wake-up mode. The safety module 30 is then immediately functional, and does not require an additional control wire to control the standby and wake-up modes.

If no activity of the pulse width modulated signal is detected, and after a predetermined confirmation time, the safety module 30 can be placed in the standby mode (low consumption of current by the battery 10).

Figure 3B:
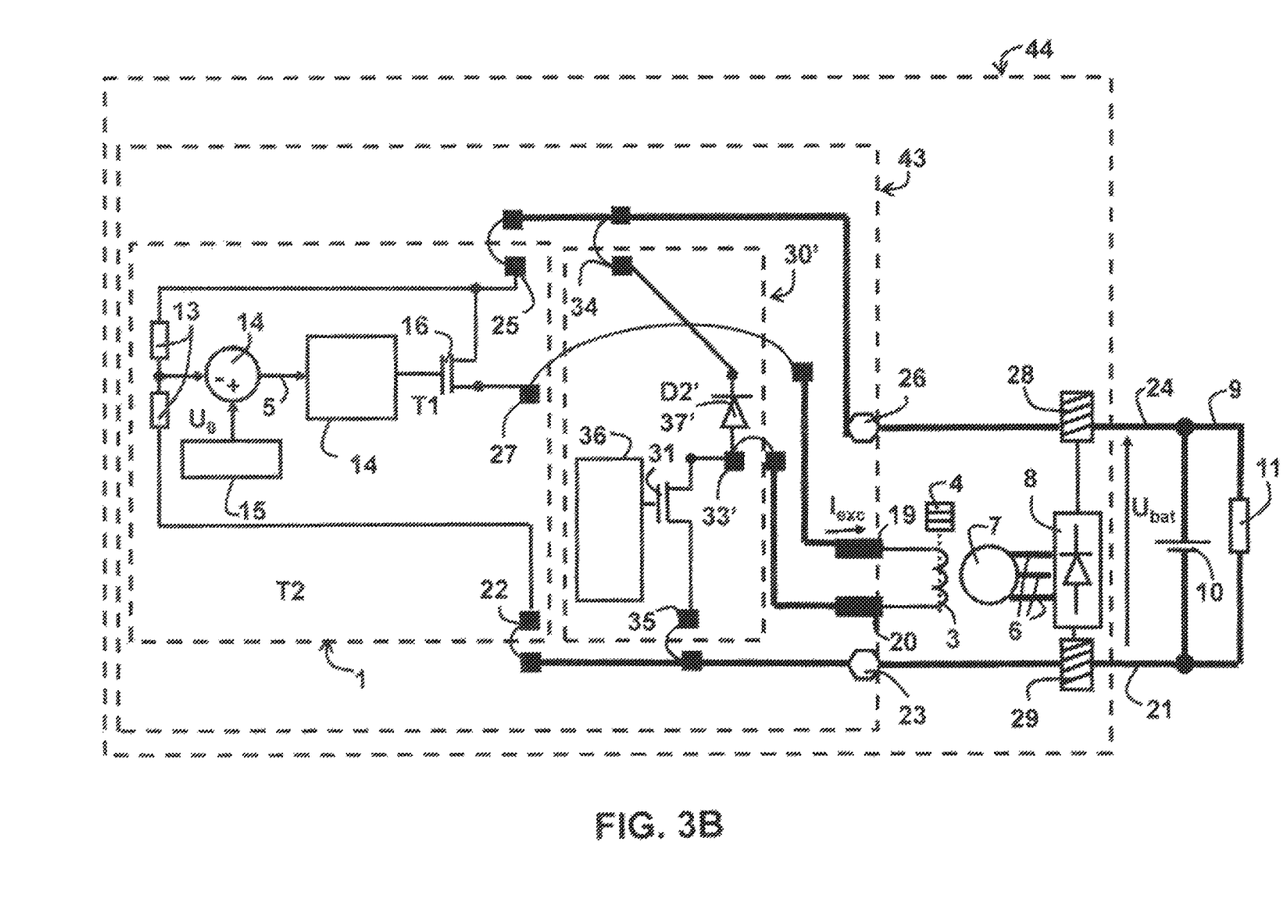
FIGS. 3B and 3C are overviews of a voltage regulator for an alternator equipped with a safety module according to first and second variants of the first embodiment in FIG. 3A.
Figure 3C:
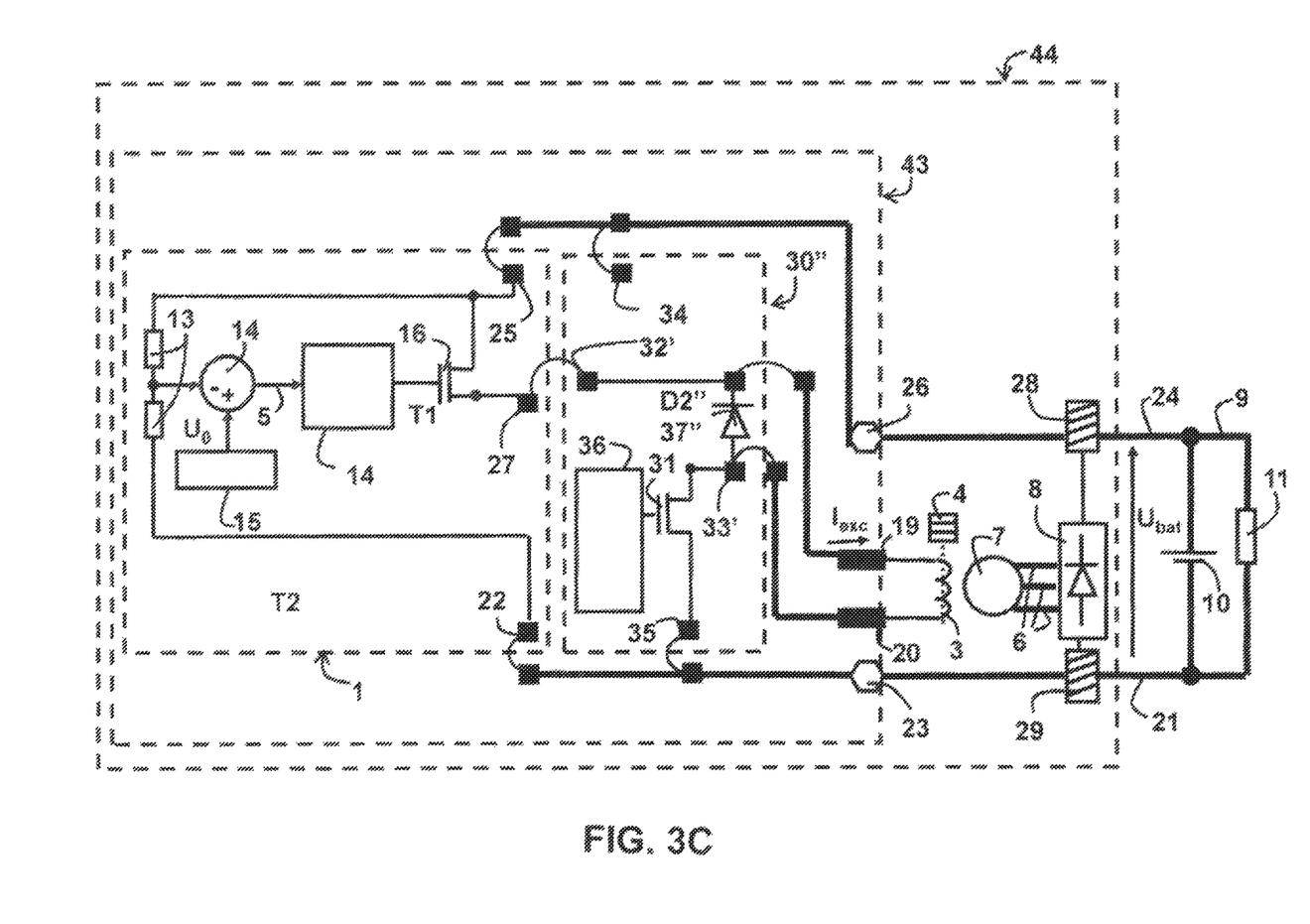

FIGS. 3B and 3C show schematically an alternator 2, 44 comprising a regulator brush-holder 18, 43 incorporating a voltage regulator 1 and a safety module 30', 30", corresponding to 1$^{st}$ and second variants of the first embodiment of the invention in FIG. 3A.

In these variants, the excitation winding 3 is fitted between two branches of an architecture of the type of a bridge in the form of an "H".

In the first variant in FIG. 3B, a first branch of this bridge in the form of an "H" comprises the first semiconductor switch 16 and the first free wheel diode D1, 17 of the voltage regulator 1. A second branch of this bridge in the form of an "H" comprises the second semiconductor switch 31 and a second free wheel diode D2', 37' of the safety module 30'. The second semiconductor switch 31 is in this case connected according to a so-called low-side fitting between the earthing terminal 35 and an excitation terminal 33'. The excitation terminal 33' is situated at a midpoint of the second branch. The free wheel diode D2' is connected between the excitation terminal 33' and the supply terminal 34. The two ends of the excitation winding 3 are connected respectively to the excitation terminals 27 and 33' by means of the brushes 19 and 20 respectively. With the exception of the demagnetisation obtained by means of the free wheel diode D1, D2', and which will not be described in detail here, the operation of the safety module 30' remains globally similar to that of the safety module 30.

The second variant, in FIG. 3C, comprises a safety module 30". This second variant differs from the first variant in FIG. 3B in that the free wheel diodes D1, 17, and D2', 37' are eliminated and replaced by a single free wheel diode D2", 37". This free wheel diode D2" is fitted in parallel with the excitation winding 3, between the excitation terminals 27 and 33'. With the exception of the demagnetisation obtained by means of the free wheel diode D2", and which will not be described in detail here, the operation of the safety module 30" remains globally similar to that of the safety modules 30 and 30'.

Figure 4:
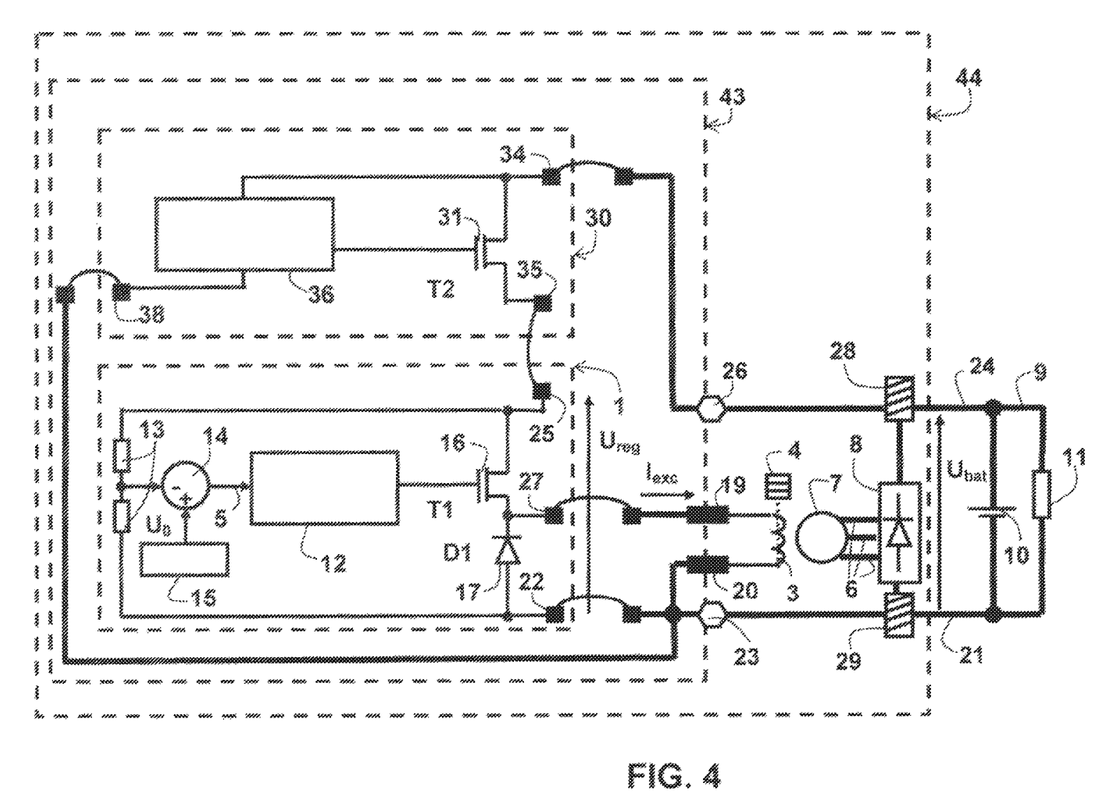
FIG. 4 is an overview of a voltage regulator for an alternator with a safety module according to the second embodiment of the invention.

FIG. 4 shows schematically an alternator 2, 44 comprising a regulator brush-holder incorporating a voltage regulator 1, 30 in a second embodiment of the invention.

In this second embodiment, a safety module 30 is placed in series in the positive line 24 of the on-board network 9, in order to supply a regulation module 1 which is identical to that of the known voltage regulator shown in FIG. 1.

In this case, the safety module 30 comprises a second semiconductor switch 31 of the MOSFET transistor type connected between the second supply terminal 34, which is connected to the positive line 24, and a second earthing terminal 35, which is connected to the first supply terminal 25 of the regulation module 1.

The second semiconductor switch 31 cuts off the excitation current Iexc supplied by the on-board network 9 via the first semiconductor switch 16, when the control circuit 36 detects an excess voltage on the second supply terminal 34, relative to a third earthing terminal 38, which is designed to be connected to the earth 21.

Since the regulation module 1 is not modified, a measurement Ureg of the regulation voltage Ubat is carried out by the voltage divider bridge 13 after the safety module 30, on the first supply terminal 25, relative to the first earthing terminal 22.

In these conditions, the regulation voltage Ubat is increased for a given set voltage U0 because of the series resistance of the second semiconductor switch 31.

For example, for an excitation current Iexc of 5 A and a resistance in the "on" state of 0.1Ω, the regulation voltage Ubat is increased by ΔV=0.5V. For a set voltage U0 of 14V, the regulation voltage Ubat on the on-board network 9 is 14.5V.

Figure 5:
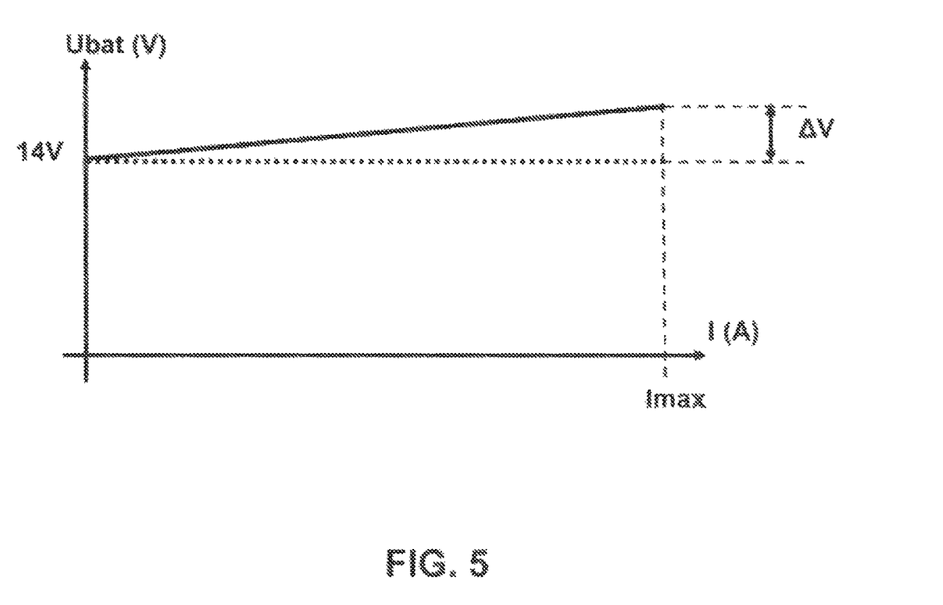
FIG. 5 illustrates the development of the regulation voltage according to the output for the regulator shown in FIG. 4.

Thus, as shown clearly in FIG. 5, the regulation voltage Ubat according to the charge increases according to the current output I.

If the failure of the second semiconductor switch 31 is of the resistive type, the regulation voltage Ubat increases considerably.

For example, for an excitation current Iexc of 5 A and a series resistance of the second defective semiconductor switch 31 of approximately 1Ω, the regulation voltage Ubat is increased by ΔV=5V.

Figure 6:
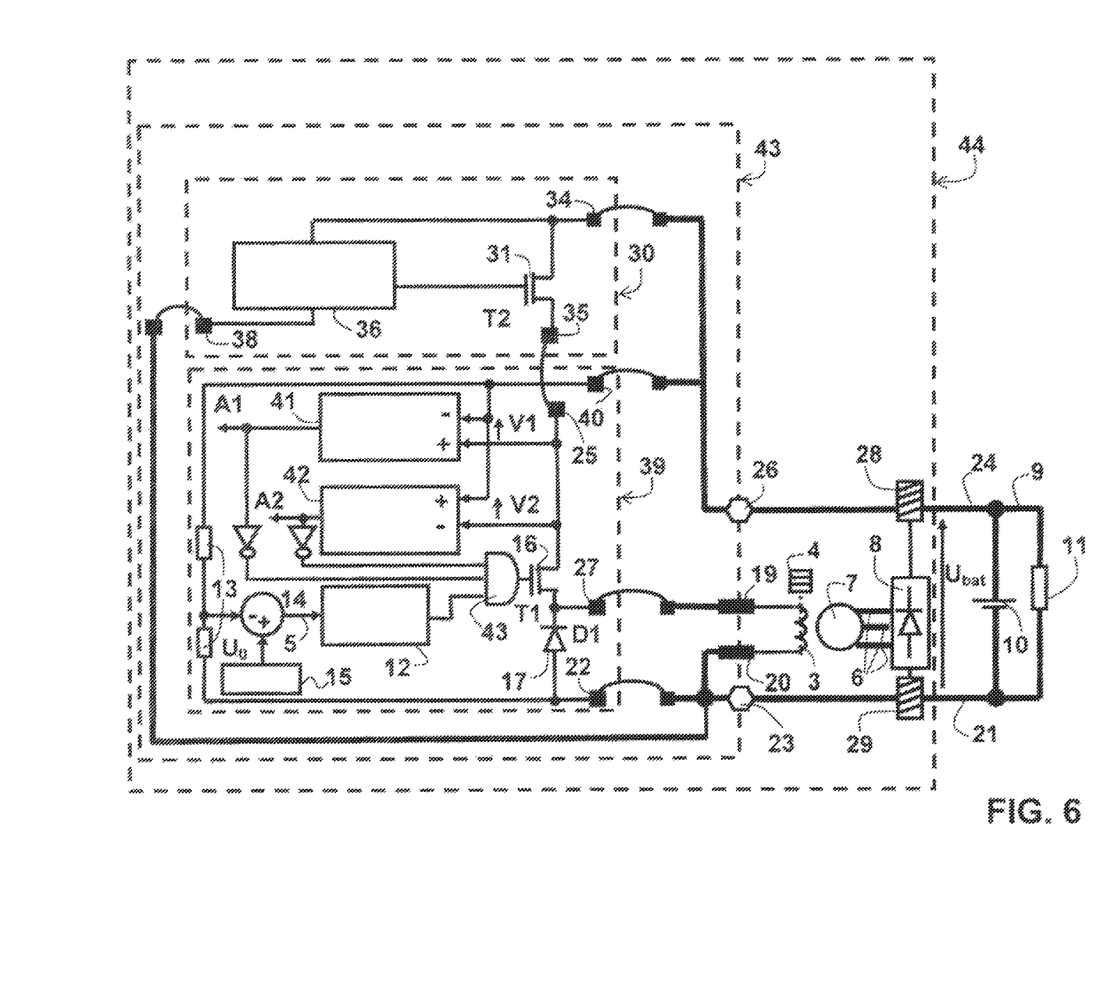
FIG. 6 is an overview of a voltage regulator for an alternator with a safety module according to a variant of the second embodiment of the invention shown in FIG. 4.

A variant of this second embodiment of the invention makes it possible to correct these errors of the regulation loop 12 by using a modified regulation module 39, as shown in FIG. 6.

In the modified regulation module 39, the measurement terminal 40 to which the voltage divider bridge 13 is connected is no longer combined with the first supply terminal 25.

This measurement terminal 40 is designed to be connected directly to the positive line 24, whereas the first supply terminal 25 is connected to this positive line 24 via the second semiconductor switch 31.

This variant makes it possible to measure the regulation voltage Ubat directly on the network 9, and consequently to eliminate the voltage drop ΔV introduced by the safety module 30.

In this variant, the regulation module 39 additionally comprises first and second monitoring devices 41, 42, which make it possible to process respectively the case of breakage of a link between the measurement terminal 40 and the positive line 24, or the case of a failure of the second semiconductor switch 31.

The first monitoring device 41 commands the opening of the first semiconductor switch 16 by inhibiting the pulse width modulated signal by means of a logic gate 43, when a first differential voltage V1 between the first supply terminal 25 and the measurement terminal 40 is greater than a first predetermined threshold.

A first alarm A1 is sent to the dashboard by the first monitoring device 41, in order to indicate this disconnection of the measurement terminal 40 of the on-board network 9.

The second monitoring device 42 commands the opening of the first semiconductor switch 16, by also inhibiting the pulse width modulated signal by means of the same logic gate 43, when a second differential voltage V2 between the measurement terminal 40 and the first supply terminal 25 is greater than a second predetermined threshold.

A second alarm A2 is sent to the dashboard by the second monitoring device 42, in order to indicate this failure of the second semiconductor switch 31.

The fact that the regulation module 1 and the safety module 30 are separate makes it possible to add a safety function easily to existing brush holders 18.

In fact, in these brush holders 18, the regulation module 1 is connected electrically to a circuit of tracks (in thick lines) by interconnections of the bonding type, as described in association with FIG. 1.

In the first and second embodiments of the invention, the safety module 30 can be added by bonding on the circuit of tracks whilst retaining the same regulation module 1, in order to obtain a regulator brush-holder 43 with a safety function which can be integrated in an improved alternator 44.

It will be appreciated that the invention is not limited simply to the preferred embodiments described above. In particular, the type of semiconductor switch 16, 31 cited is non-limiting. Nor are the numerical values indicated limiting.

Other embodiments would not depart from the context of the present invention, provided that they are derived from the following claims.

The invention claimed is:

1. Voltage regulator (1, 30, 39) of a motor vehicle alternator (2, 44) of the type comprising a regulation module (1, 39) which can control an excitation current (Iexc) in an excitation winding (3) of said alternator (2, 44), according to a difference (5) between a set voltage (U0) and a regulation voltage (Ubat) of an on-board network (9) of said vehicle supplied by a battery (10) to which said alternator (2, 44) is connected, said regulation module (1, 39) comprising:
 a first earthing terminal (22) which is designed to be connected to an earth (21) of said on-board network (9);
 a first supply terminal (25) which is designed to be connected to a positive line (24) of said on-board network (9);
 a first excitation terminal (27) which is designed to be connected to said excitation winding (3);
 a measurement terminal (25, 40) which is designed to measure said regulation voltage (Ubat);
and comprising:
 a voltage divider bridge (13), which is connected firstly to said measurement terminal (25, 40) and secondly to said first earthing terminal (22);
 a subtracter (14) which is connected at its input to said set voltage (U0), and to a midpoint of said voltage divider bridge (13);
 a regulation loop (12) which is connected at its input to said subtracter (14), and controls at its output a first semiconductor switch (16) which is connected between said first supply terminal (25) and said first excitation terminal (27);
 a first free wheel diode (17) which is connected between said first excitation terminal (17) and said first earthing terminal (22);
wherein it also comprises a safety module (30) which carries out a function of monitoring of said regulation voltage (Ubat), which module is distinct from said regulation module (1, 39).

2. Voltage regulator (1, 30) of a motor vehicle alternator (44) according to claim 1, wherein said measurement terminal (25) is combined with said first supply terminal (25), and wherein said safety module (30) comprises:
 a second supply terminal (34) which is designed to be connected to said positive line (24);
 a second earthing terminal (35) which is designed to be connected to said earth (21);
 a second excitation terminal (32) which is connected to said first excitation terminal (27);
 a third excitation terminal (33) which is designed to be connected to said excitation winding (3);
and wherein said safety module (30) comprises:
 a second semiconductor switch (31) which is connected in series to said excitation winding (3), between said second and third excitation terminals (32, 33);
 a second free wheel diode (37) which is connected between said third excitation terminal (33) and said second earthing terminal (35);
 a control circuit (36) which commands a blocked state of said second semiconductor switch (31) in the event of detection of an excess voltage on said second supply terminal (34) relative to said second earthing terminal (35), and commands re-establishment of an "on" state in the absence of said excess voltage, according to a predetermined strategy.

3. Voltage regulator (1, 30) of a motor vehicle alternator (44) according to claim 2, wherein said safety module (30) comprises standby and wake-up modes which are dependent on a variation of an excitation voltage on said second excitation terminal (32).

4. Regulator brush-holder (18, 43) of a motor vehicle alternator (2) comprising a voltage regulator (1, 30, 39) according to claim 2.

5. Regulator brush-holder (18, 43) of a motor vehicle alternator (2) comprising a voltage regulator (1, 30, 39) according to claim 3.

6. Voltage regulator (1, 30) of a motor vehicle alternator (44) according to claim 1, wherein said measurement terminal (25) is combined with said first supply terminal (25), and wherein said safety module (30) comprises:
 a second supply terminal (34) which is designed to be connected to said positive line (24);
 a second earthing terminal (35) which is connected to said first supply terminal (25);
 a third earthing terminal (38) which is designed to be connected to said (21) earth;
and wherein said safety module (30) comprises:
 a second semiconductor switch (31) which is connected in series to said regulation module (1) between said second supply terminal (34) and said second earthing terminal (35);
 a control circuit (12) which commands a blocked state of said second semiconductor switch (31) in the event of detection of an excess voltage on said second supply terminal (34) relative to said third earthing terminal (38), and commands re-establishment of an "on" state in the absence of said excess voltage, according to a predetermined strategy.

7. Regulator brush-holder (18, 43) of a motor vehicle alternator (2) comprising a voltage regulator (1, 30, 39) according to claim 6.

8. Voltage regulator (30, 39) of a motor vehicle alternator (44) according to claim 1, wherein said measurement terminal (40) is designed to be connected to said positive line (24), and wherein said safety module (30) comprises:
 a second supply terminal (34) which is designed to be connected to said positive line (24);
 a second earthing terminal (35) which is connected to said first supply terminal (25);
 a third earthing terminal (38) which is designed to be connected to said earth (21);
and wherein said safety module (30) comprises:
 a second semiconductor switch (31) which is connected in series to said regulation module (39) between said second supply terminal (34) and said second earthing terminal (35);
 a control circuit (36) which commands a blocked state of said second semiconductor switch (31) in the event of detection of an excess voltage on said second supply terminal (34) relative to said third earthing terminal (38), and commands re-establishment of an "on" state in the absence of said excess voltage, according to a predetermined strategy.

9. Voltage regulator (30, 39) of a motor vehicle alternator (44) according to claim 8, wherein said regulation module (39) additionally comprises a first monitoring device (41) which controls said first semiconductor switch (16) in a first open state when a first differential voltage (V1) between said first supply terminal (25) and said measurement terminal (40) is greater than a first predetermined threshold.

10. Regulator brush-holder (18, 43) of a motor vehicle alternator (2) comprising a voltage regulator (1, 30, 39) according to claim 9.

11. Voltage regulator (30, 39) of a motor vehicle alternator (44) according to claim 9, wherein said regulation module (39) additionally comprises a second monitoring device (42) which controls said first semiconductor switch (16) in a second open state when a second differential voltage (V2) between said measurement terminal (40) and said first supply terminal (25) is greater than a second predetermined threshold.

12. Regulator brush-holder (18, 43) of a motor vehicle alternator (2) comprising a voltage regulator (1, 30, 39) according to claim 11.

13. Voltage regulator (30, 39) of a motor vehicle alternator (44) according to claim 11, wherein said first and second monitoring devices (41, 42) send respectively a first or second alarm (A1, A2) to a dashboard of said vehicle in the event, respectively, of breaking of a connection between said measurement terminal (40) and said positive line (24) or a failure of said second semiconductor switch (31).

14. Regulator brush-holder (18, 43) of a motor vehicle alternator (2) comprising a voltage regulator (1, 30, 39) according to claim 13.

15. Regulator brush-holder (18, 43) of a motor vehicle alternator (2) comprising a voltage regulator (1, 30, 39) according to claim 8.

16. Regulator brush-holder (18, 43) of a motor vehicle alternator (2) comprising a voltage regulator (1, 30, 39) according to claim 1.

17. Regulator brush-holder (43) of a motor vehicle alternator (44) according to claim 16, wherein said regulation module (1, 39) and said safety module (30) are connected electrically by external interconnections of the bonding type.

18. Regulator brush-holder (43) of a motor vehicle alternator (44) according to claim 17, wherein said regulation module (1, 39) and said safety module (30) are also connected electrically by other external interconnections of the bonding type to a circuit of tracks which is connected, firstly to brushes (19, 20) which can ensure an electrical connection to said excitation winding (3), and secondly, to a first screw (28) which forms a positive terminal of said alternator (44), and to a second screw (29) which forms a negative terminal of said alternator (44).

19. Motor vehicle alternator (2, 44), comprising a regulator brush-holder (43) according to claim 16.

* * * * *